United States Patent
Yuzurihara et al.

(10) Patent No.: US 6,760,234 B2
(45) Date of Patent: Jul. 6, 2004

(54) DC POWER SUPPLY APPARATUS FOR A PLASMA GENERATING APPARATUS

(75) Inventors: Itsuo Yuzurihara, Zamashi (JP); Masami Arai, Matidashi (JP)

(73) Assignee: Kyosan Electric Mfg. Co. Ltd., Yokohama (JP)

(*) Notice: Subject to any disclaimer, the term of this patent is extended or adjusted under 35 U.S.C. 154(b) by 0 days.

(21) Appl. No.: 10/228,330

(22) Filed: Aug. 27, 2002

(65) Prior Publication Data

US 2004/0004848 A1 Jan. 8, 2004

(30) Foreign Application Priority Data

Jul. 5, 2002 (JP) ........................................ 2002-197478

(51) Int. Cl.[7] .............................................. H02M 3/335
(52) U.S. Cl. ...................................... 363/16; 363/131
(58) Field of Search ............................. 363/16, 17, 37, 363/89, 131, 132

(56) References Cited

U.S. PATENT DOCUMENTS

| 4,358,726 | A | * | 11/1982 | Iwakane et al. | ............ | 318/798 |
| 4,560,908 | A | * | 12/1985 | Stupp et al. | ................. | 315/219 |
| 6,011,704 | A | * | 1/2000 | Coleman | ....................... | 363/37 |
| 6,028,777 | A | * | 2/2000 | Nguyen et al. | ................ | 363/37 |
| 6,504,132 | B1 | * | 1/2003 | Church | ..................... | 219/130.1 |

* cited by examiner

Primary Examiner—Adolf Berhane
(74) Attorney, Agent, or Firm—Oliff & Berridge, PLC (57) ABSTRACT

A DC power supply apparatus for supplying a DC power to a plasma generating device, includes: an input section for converting an inputted AC power into a DC power; a current type of inverter connected with a next stage of the input section; a transformer having a primary winding and a secondary winding, the primary winding being connected with the current type of inverter; a rectifying section for rectifying an AC power generated in the secondary winding of the transformer; and a smoothing circuit for smoothing the rectified power which is rectified by the rectifying section; wherein an electric energy to be supplied to the plasma generating device is controlled by controlling a switching operation of the current type of inverter as a current source.

7 Claims, 9 Drawing Sheets

DC POWER SUPPLY APPARATUS FOR A PLASMA GENERATING APPARATUS

BACKGROUND OF THE INVENTION

1. Field of the Invention

The present invention relates to a DC power supply apparatus, in particular, a DC power supply apparatus for supplying a DC power to a plasma generating device for a sputtering.

2. Description of Related Art

According to an earlier development, in a process for producing a semiconductor or the like, as a power supply apparatus (hereinafter, occasionally referred to as "DC power supply") for supplying a stable DC power to a plasma generating device for a sputtering, a voltage type of DC power supply apparatus which functions as a voltage source for a load, was used.

Figure 9:
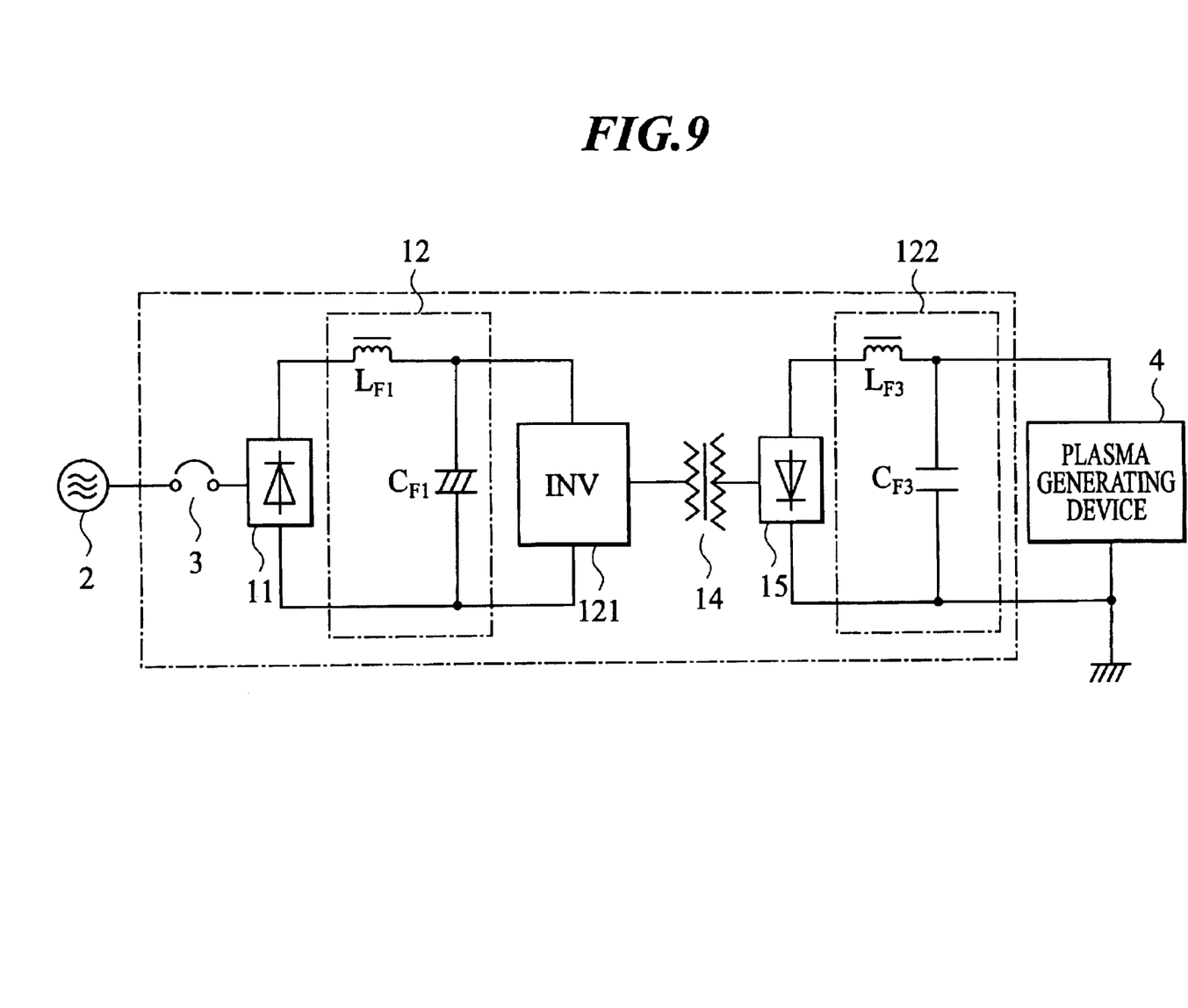
FIG. 9 is a view showing a circuit structure of a DC power supply according to an earlier development.

FIG. 9 shows an example of a structure of a DC power supply 5 according to an earlier development. In FIG. 9, the DC source 5 comprises a breaker 3, a rectifier 11, a DC filter 12, an inverter 121, a transformer 14, a rectifier 15 and a DC filter 122.

The rectifier 11 is a bridge-type of three-phase full wave rectifying circuit or the like, which uses a diode or the like as a rectifying element. The rectifier 11 carries out a full-wave rectification of an AC power inputted from a commercial power supply unit 2 through the breaker 3, to convert it into a DC power.

The DC filter 12 is an LC filter having a DC reactor $L_{F1}$ and a smoothing capacitor $C_{F1}$, and smoothes the DC power rectified by the rectifier 11.

The inverter 121 comprises a bridge-connected semiconductor switch, and converts the DC power smoothed by the DC filter 12 into an AC power. The inverter 121 is a voltage type of inverter which is operated by a pulse width control, a pulse frequency control or the like.

The transformer 14 is one having two windings (a primary winding and a secondary winding) which are electromagnetically coupled with each other. The transformer 14 transforms the output voltage of the inverter 121, which is applied to the primary winding, according to the turn ratio thereof. Then, the voltage is generated by the secondary winding.

The rectifier 15 comprises a bridge-type of full wave rectifying circuit or the like, which uses a diode or the like. The rectifier 15 rectifies the AC power generated by the secondary winding of the transformer 14, to convert it into a DC power.

The DC filter 122 is an LC filter having a DC reactor $L_{F3}$ and a smoothing capacitor $C_{F3}$, and smoothes the DC power rectified by the rectifier 15.

As described above, after the DC power supply 5 generates a DC power by rectifying and smoothing the input AC power, the generated DC power is converted into an AC power by the inverter 121. After the voltage transformation, the DC power supply 5 outputs a DC power by rectifying and smoothing the AC power again. That is, the DC power supply 5 operates as a voltage source. The discharge current is determined in accordance with the output voltage and the impedance of the plasma generating device 4. That is, the DC power supply 5 is a voltage type of DC power supply apparatus.

During the plasma generation, if an arc discharge is caused in the plasma generating device 4, there is some possibility that a film is damaged. As a treatment for an arc discharge which is harmful to a film, the following three methods (I) to (III) have been used.

(I) A power supply is temporarily stopped.

In this case, when the generation of the arc discharge is detected, the operation of the DC power supply 5 is stopped. After a certain time elapsed, the operation thereof is restarted.

(II) A reverse voltage is applied by an LC resonance.

In this case, in the DC power supply 5, an LC resonance circuit having a reactance and a capacitor is provided between the DC filter 122 and the plasma generating device 4. By generating a reverse voltage by the LC resonance which is one of the resonance phenomena, the generated arc is self-arc-extinguished.

(III) A reverse voltage is applied by a semiconductor switch element.

In this case, in the DC power supply 5, a reverse voltage generating circuit 20 having a semiconductor switch element is provided between the DC filter 122 and the plasma generating device 4. When the generation of the arc discharge is detected, a reverse voltage is generated by the semiconductor switch element to forcedly arc-extinguish the generated arc.

Among the reverse voltage generating circuits, there are some ones which can detect the increase in discharge current or the decrease in discharge current and can forcedly arc-extinguish the arc before the arc current flows.

As described above, as a treatment for the arc discharge, there are three methods (I) to (III). According to the required quality of the film, one method was selected from the three methods (I) to (III).

However, the DC power supply 5 according to an earlier development, has the following problems.

(1) When the arc discharge is frequently generated, an output current cannot be controlled by the above methods (I) to (III).

In the method (I) in which the power supply is temporarily stopped, because the operation of the DC power supply 5 is stopped whenever the arc is generated, the operation of DC power supply 5 and the stop of the DC power supply 5 are frequently repeated. Further, in this method, because the energy of the DC filter 122 is released even though the operation of the DC power supply 5 is stopped, the film is damaged.

In the method (II) using the LC resonance or the method (III) using the semiconductor switch, while the arc-extinguishing operation is repeated, the output current of the DC power supply 5 gradually increases. When the output current exceeds a predetermined value, the DC supply source 5 is stopped by a protect circuit like the method (I).

In order to prevent the increase in output current, there was a method in which a DC reactor is inserted in series. However, because the DC reactor generally has a large size, the problems relating to the cost, the structure and the storage are occurred.

(2) The restart of the normal discharge is delayed.

In the method (I), because the DC power supply 5 is restarted, the time for restarting the DC power supply 5 is required. Even in the methods (II) and (III) in which the DC power supply 5 is not required to stop, the reflow of the discharge current which flows again is delayed by the wiring impedance and the like. Therefore, there is some possibility that the restart of the normal discharge is delayed.

In the present sputtering process, the discharge time tends to be shortened in one process. Therefore, when the arc discharge is frequently caused, the time delay caused by restarting the discharge is not negligible. As a result, the sum of time for the normal discharge becomes short. The degradation in quality of the film, such as a lack of thickness thereof is caused.

(3) Because the discharge current cannot be controlled for the constant voltage characteristic of the plasma generating device, the operation of the DC supply source 5 is not stable.

When the plasma generating device 4 treats as a load of the DC supply source 5, the voltage-current characteristics are close to the constant voltage characteristics. That is, although the current is largely changed on the basis of the intensity of the flowing DC power, the voltage is hardly changed. Therefore, for the DC supply source 5, the current is controlled more than the voltage by the control of the power to be supplied to the plasma generating device 4.

However, as described above, the DC power supply 5 is a voltage type of DC power supply apparatus which functions as a voltage source. That is, the DC power supply 5 supplies an output power as a voltage source. This easily causes the DC power supply to be unstable as compared with the DC power supply which function as a current source. Further, unnecessary resonance phenomena and the hunting are caused.

As described above, the DC power supply 5 according to an earlier development, has the above three problems (1) to (3). That is, the following three functions are required.

(a) An arc-extinguishment is certainly carried out and the output current is controlled even in the arc generating condition.

(b) After the arc discharge is extinguished, the normal discharge is immediately restarted.

(c) The discharge current is kept stable.

SUMMARY OF THE INVENTION

In order to solve the above-described problems, an object of the present invention is to realize a DC power supply which satisfies the above three requirements (a) to (c).

That is, in accordance with the first aspect of the present invention, a DC power supply apparatus for supplying a DC power to a plasma generating device, comprises:

an input section for converting an inputted AC power into a first DC power;

a current type of inverter connected with a next stage of the input section;

a transformer having a primary winding and a secondary winding, the primary winding being connected with the current type of inverter;

a rectifying section for rectifying a first AC power generated in the secondary winding of the transformer; and a smoothing circuit for smoothing the rectified power which is rectified by the rectifying section;

wherein an electric energy to be supplied to the plasma generating device is controlled by controlling a switching operation of the current type of inverter as a current source.

According to the present invention, by controlling the switching operation of the current type of inverter, the electric energy to be supplied to the plasma generating device is controlled. That is, the so-called current type of DC power supply apparatus for supplying the stable DC power to the plasma generating device as a lord in a current source operation, can be realized.

In the plasma generating device as a load, the current is largely changed in accordance with the intensity of the inputted DC power. However, the plasma generating device has a property that the voltage is hardly changed. Therefore, by controlling the power not as a voltage source but as a current source, it is possible to control the power more stably.

Because the DC power supply is operated as a current source, the secondary current of the transformer does not be influenced by the impedance of the secondary circuit. Therefore, the DC reactor which must be provided on the secondary side of the transformer in case of the voltage source, is not required. The size of the apparatus can be minimized.

The current type of inverter may be a series-resonance type of inverter having a resonance reactor and a resonance capacitor which are connected in series.

The DC power supply apparatus further comprises a reverse voltage generating circuit which comprises:

a first tertiary winding which is electromagnetically coupled with the primary winding of the transformer;

a capacitor for rectifying a second AC power generated in the first tertiary winding and for storing a second DC power; and a voltage applying section for monitoring whether an output voltage outputted to the plasma generating device is lower than a predetermined threshold value voltage, and for applying a reverse voltage to the plasma generating device by discharging the second DC power stored in the capacitor.

According to the present invention, a reverse voltage is applied to the plasma generating device. Therefore, when the arc is generated in the plasma generating device, it is possible to forcedly extinguish the arc immediately by applying the reverse voltage.

After the arc is extinguished, there is some possibility that the reflow of the discharge current is delayed by the property of the plasma generating device, the wiring impedance or the like. However, in this case, by discharging the energy stored in the DC reactor, the reflow of the discharge current is promoted to shorten the discharge suspending time after the arc extinguishment.

Depending on whether the output voltage is lower than the predetermined threshold value voltage, the reverse voltage can be applied. Therefore, because not the change of the output voltage (for example, the differential value) but the output voltage value itself is monitored, it is prevented that for example, the temporary voltage change which is caused by the restart of the normal discharge is judged to be the arc.

The DC power supply apparatus further comprises a power regenerative section which comprises a second tertiary winding which is electromagnetically coupled with the primary winding of the transformer;

wherein a third AC power generated in the second tertiary winding is rectified and is converted into a third DC power, the power regenerative section regenerates the third DC power to the input section.

According to the present invention, the transmitted power of the current type of inverter can be partially or wholly regenerated to the input section. For example, when the load of the plasma generating device is lightened and the power consumed by the plasma generating device is lower than the minimum power transmitted by the current type of inverter, the DC power supply apparatus cannot be controlled. In this case, by regenerating the power corresponding to the difference between the transmitted power of the current type of inverter and the consumed power of the load, to the input section, the stable control of the DC power supply apparatus can be realized in a broader output range.

The DC power supply apparatus further comprises a step-up section which comprises a third tertiary winding which is electromagnetically coupled with the primary winding of the transformer;

wherein by overlapping a fourth DC power obtained from a fourth AC power generated in the third tertiary winding and a main DC power obtained from the first AC power generated in the secondary winding of the transformer, the step-up section temporarily steps up an apparatus output voltage to be outputted from the DC power supply apparatus.

According to the present invention, the output voltage of the DC power supply apparatus can be temporarily stepped up. When the plasma generating device starts to operate, the high voltage which is required to start the discharge is supplied by temporarily increasing the output voltage. Therefore, the rapid and reliable discharge start can be realized. Further, when this function is used in only the case that the operation is started, the lord of the step-up section, which relates to the current, can be reduced.

The current type of inverter may comprise four semiconductor switches which are bridge-connected. Each semiconductor switch may be connected with a diode in anti-parallel.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIGS. 3A to 3I are timing charts showing the operation of the DC power supply shown in FIG. 2;

PREFERRED EMBODIMENT OF THE INVENTION

Hereinafter, the preferred embodiment of the present invention will be explained with reference to the drawings. In the following explanation, the same reference numeral is attached to the same element as FIG. 9, and the detailed explanation thereof is omitted.

Figure 1:
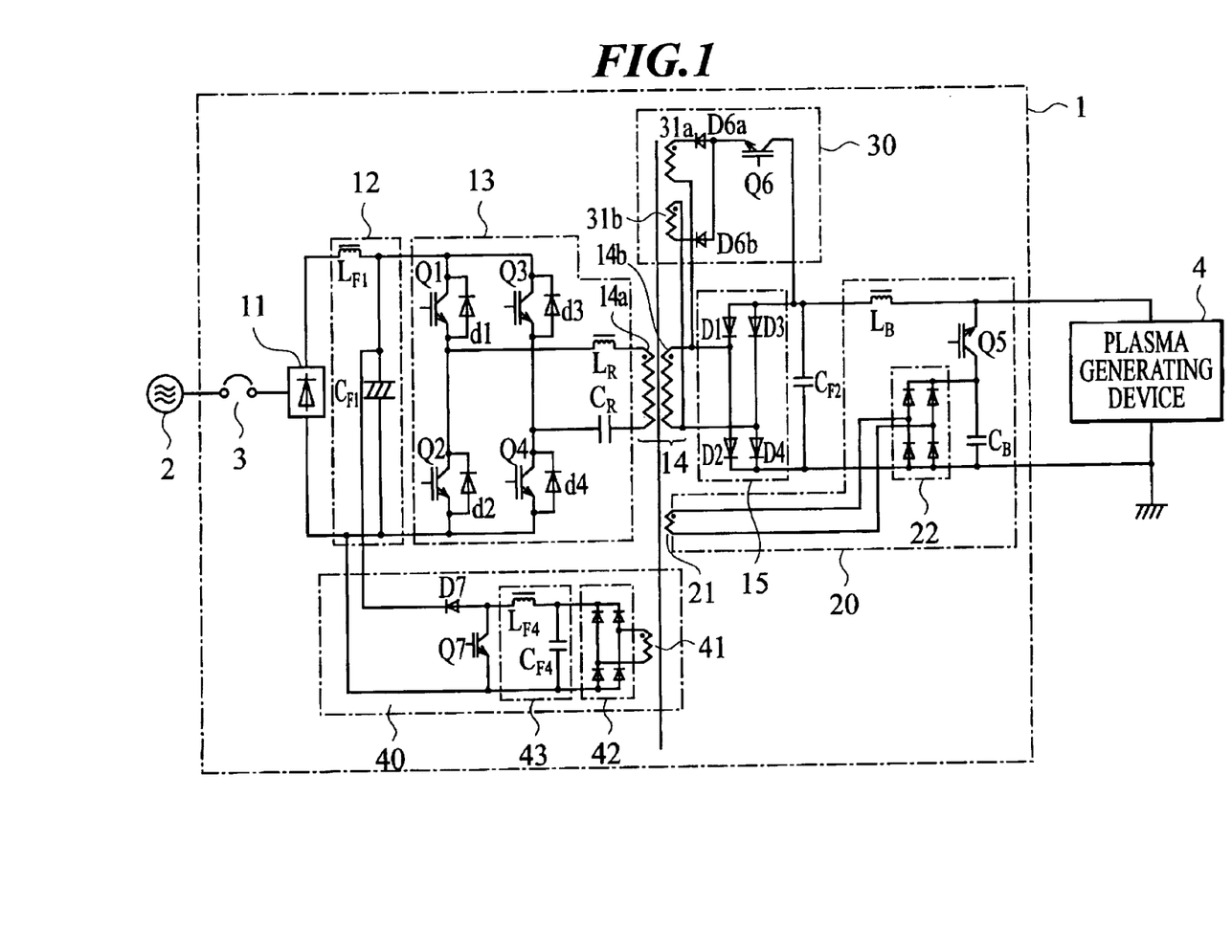
FIG. 1 is a view showing a circuit structure of a DC power supply according to the preferred embodiment.

FIG. 1 is a view showing a circuit structure of a DC power supply 1 according to the preferred embodiment.

In FIG. 1, three-phase AC power supplied from a commercial power supply unit 2 is inputted into a DC power supply 1. The DC power supply 1 converts the inputted AC power into a DC power to output it to the plasma generating device 4. That is, the DC power supply 1 functions as an AC/DC converter.

The DC power supply 1 comprises a breaker 3, a rectifier 11, a DC filter 12, an inverter 13, a transformer 14, a rectifying circuit 15, a smoothing capacitor $C_{F2}$, a reverse voltage generating circuit 20, an ignition power supply circuit 30 and a power regenerative circuit 40.

The rectifier 11 is a three-phase full wave rectifying circuit which uses a diode or the like as a rectifying element. The rectifier 11 rectifies the three-phase AC power inputted through the breaker 3 and converts it into a DC power. An output positive terminal of the rectifier 11 is connected with one end of a DC reactor $L_{F1}$ of the DC filter 12, which will be explained below. An output negative terminal thereof is connected with the other end of a smoothing capacitor $C_{F1}$ of the DC filter 12, which will be explained below.

The DC filter 12 is an LC filter comprising a DC reactor $L_{F1}$ and a smoothing capacitor $C_{F1}$. The DC filter 12 smoothes the DC power rectified by the rectifier 11.

One end of the DC reactor $L_{F1}$ is connected with the output positive terminal of the rectifier 11. The other end thereof is connected with one end of the smoothing capacitor $C_{F1}$.

One end of the smoothing capacitor $C_{F1}$ is connected with the other end of the DC reactor $L_{F1}$. The other end thereof is connected with the output negative terminal of the rectifier 11. Further, one end of the smoothing capacitor $C_{F1}$ is connected with a cathode of a diode D7 of the power regenerative circuit 40, which will be explained below. The other end thereof is connected with an emitter of a semiconductor switch Q7 of the power regenerative circuit 40, which will be explained below.

The inverter 13 is a series resonance type of inverter comprising four bridge-connected semiconductor switches Q1, Q2, Q3 and Q4, and a series resonance tank in which a resonance reactor $L_R$ and a resonance capacitor $C_F$ are connected in series.

The semiconductor switches Q1, Q2, Q3 and Q4 are, for example, IGBTs or the like. By a voltage signal (hereinafter, referred to as "gate signal") inputted into the gate thereof, a conducting/breaking condition between the collector and the emitter (that is, the ON/OFF condition of the semiconductor switches Q1, Q2, Q3 and Q4) is controlled.

The diodes d1, d2, d3 and d4 are connected in anti-parallel with the semiconductor switches Q1, Q2, Q3 and Q4, respectively. The diodes d1, d2, d3 and d4 flow a current when a resonance current flows in the smoothing capacitor $C_{F1}$ during the latter half of the oscillation.

An emitter of the semiconductor switch Q1 is connected with a collector of the semiconductor switch Q2. An emitter of the semiconductor switch Q3 is connected with a collector of the semiconductor switch Q4. A collector of the semiconductor switch Q1 is connected with that of the semiconductor switch Q3. An emitter of the semiconductor switch Q2 is connected with that of the semiconductor switch Q4.

Further, a connecting point between the semiconductor switches Q1 and Q3 is connected with a connecting point between the DC reactor $L_{F1}$ and the smoothing capacitor $C_{F1}$. A connecting point between the semiconductor switches Q2 and Q4 is connected with the other end of the smoothing capacitor $C_{F1}$. A connecting point between the semiconductor switches Q1 and Q2 is connected with one end of the resonance reactor $L_R$. A connecting point of the semiconductor switches Q3 and Q4 is connected with one end of the resonance capacitor $C_R$.

One end of the resonance reactor $L_R$ is connected with the connecting point between the semiconductor switches Q1 and Q2. The other end thereof is connected with the head of the primary winding 14a of the transformer 14, which will be explained below.

One end of the resonance capacitor $C_R$ is connected with the connecting point between the semiconductor switches Q3 and Q4. The other end thereof is connected with the end of the primary winding 14a of the transformer 14, which will be explained below.

In the inverter 13, two pairs of the semiconductor switches facing each other, that is, a pair of the semiconductor switches Q1 and Q4 and a pair of the semiconductor switches Q2 and Q3 repeat the ON/OFF operation alternately. The inverter 13 converts the DC power outputted from the DC filter 12, into an approximately sinusoidal current.

When the inductance of the resonance reactor $L_R$ is $L_R$ and the capacitance of the resonance capacitor $C_R$ is $C_R$, the period (resonance period) $T_R$ of the resonance phenomenon is expressed by the following equation (1).

$$T_R = 2\pi \sqrt{C_R L_R} \qquad (1)$$

The transformer 14 is one comprising a primary winding 14a and a secondary winding 14b which are electromagnetically coupled with each other. The transformer 14 transforms the AC voltage applied to the primary winding 14a, according to the turn ratio between the primary winding 14a and secondary winding 14b. Then, the voltage is generated in the secondary winding 14b.

The head of the primary winding 14a is connected with the other end of the resonance reactor $L_R$. The end of the primary winding 14a is connected with the other end of the resonance capacitor $C_R$.

The head of the secondary winding 14b is connected with a connecting point between the diodes D1 and D2 of the rectifying circuit 15, which will be explained below. The end thereof is connected with a connecting point between the diodes D3 and D4 of the rectifying circuit 15, which will be explained below. Further, the head of the secondary winding 14b is connected with an end of a tertiary winding 31a of the ignition power supply circuit 30, which will be explained below. The end of the secondary winding 14b is connected with the head of the tertiary winding 31b of the ignition power supply circuit 30, which will be explained below.

The rectifying circuit 15 comprises bridge-connected diodes D1, D2, D3 and D4 and rectifies the AC power generated by the secondary winding 14b of the transformer 14.

That is, a cathode of the diode D1 is connected with an anode of the diode D2. A cathode of the diode D3 is connected with an anode of the diode D4. Further, an anode of the diode D1 is connected with that of the diode D3. A cathode of the diode D2 is connected with that of the diode D4.

Further, a connecting point between the diodes D1 and D2 is connected with the head of the secondary winding 14b of the transformer 14. A connecting point between the diodes D3 and D4 is connected with the end of the secondary winding 14b. A connecting point between the diodes D1 and D3 is connected with one end of the smoothing capacitor $C_{F2}$. A connecting point between the diodes D2 and D4 is connected with the other end of the smoothing capacitor $C_{F2}$.

The smoothing capacitor $C_{F2}$ smoothes the power rectified by the rectifying circuit 15. One end of the smoothing capacitor $C_{F2}$ is connected with the connecting point between the diodes D1 and D3. The other end thereof is connected with the connecting point between the diodes D2 and D4.

The reverse voltage generating circuit 20, the ignition power supply circuit 30 and the power regenerative circuit 40 will be explained below in detail.

Next, the operation of the DC power supply 1 will be explained.

Figure 2:
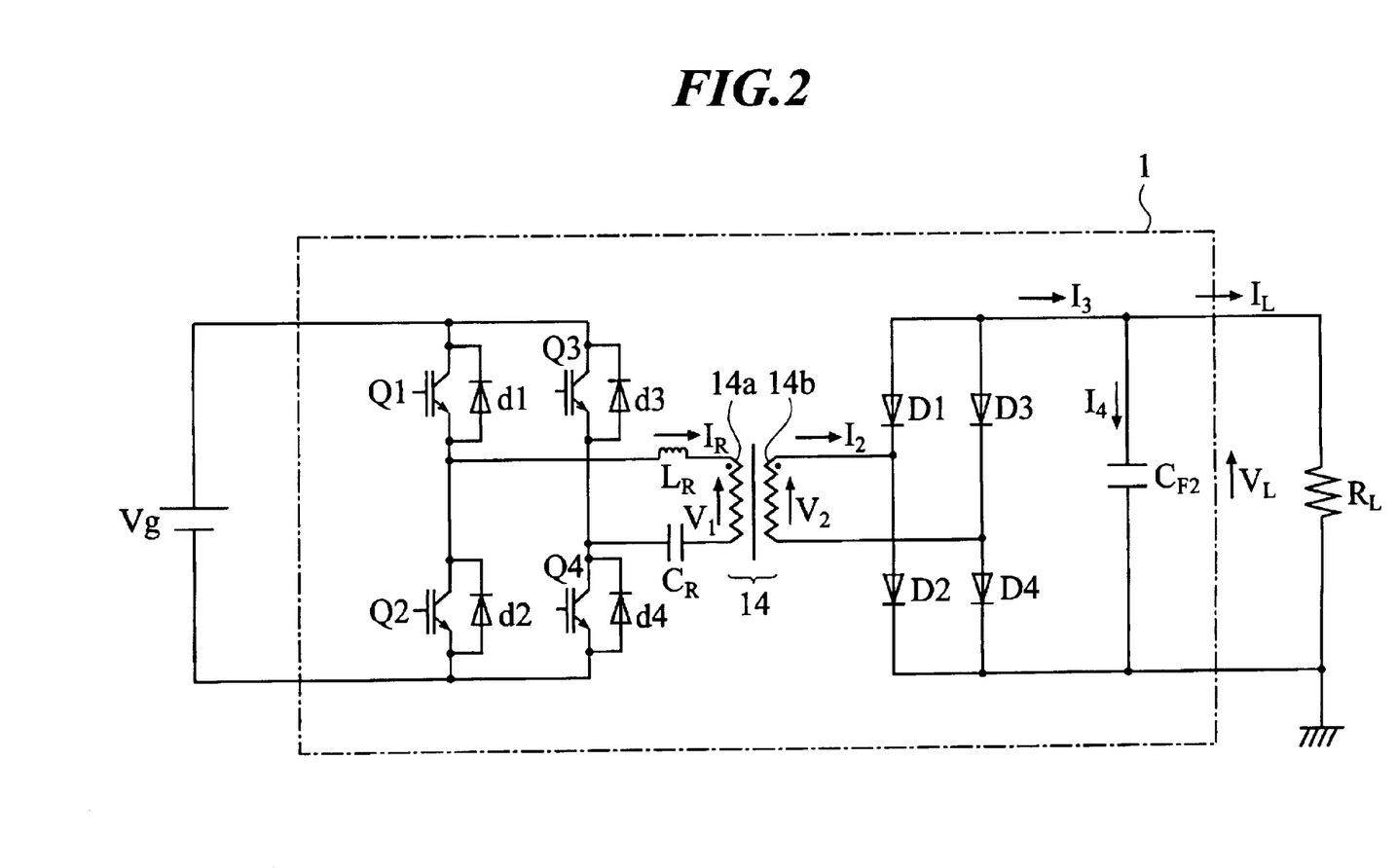
FIG. 2 is a view showing an equivalent circuit structure of the DC power supply shown in FIG. 1.

Although the reverse voltage generating circuit 20, the ignition power supply circuit 30 and the power regenerative circuit 40 will be explained below in detail, it is not necessary that any of them is operated during the normal discharge. Therefore, FIG. 2 shows the structure in which these circuits are removed from the structure of DC power supply 1 shown in FIG. 1. With reference to FIG. 2, the operation of the DC power supply 1 during the normal discharge will be explained below.

In FIG. 2, the DC power converted by the rectifier 11 and the DC filter 12, that is, the DC power inputted into the inverter 13 is equivalently replaced with a DC power supply unit $V_g$. The plasma generating device 4 for the DC power supply 1 is equivalently replaced with a load resistance $R_L$.

In FIG. 2, with respect to the voltage V and the current I shown in each portion of the DC power supply 1, the directions of the arrows shown in the drawing are positive directions. That is, in case of the input voltage $V_g$ applied to the inverter 13, the upper direction of the drawing is a positive direction. In case of the output current of the inverter 13, that is, the resonance current $I_R$ flowing into the resonance reactor $L_R$, the right direction of the drawing is a positive direction. In case of the primary voltage $V_1$ applied to the primary winding 14a of the transformer 14 and the secondary voltage $V_2$ generated by the secondary winding 14b, the upper direction of the drawing is a positive direction. In case of the secondary current $I_2$ flowing out from the head of the secondary winding 14b, the right direction of the drawing is a positive direction.

In case of the rectified current $I_3$ outputted from the rectifying circuit 15, the right direction of the drawing is a positive direction. In case of the smoothed current $I_4$ flowing into the smoothing capacitor $C_F$, the lower direction of the drawing is a positive direction. In case of the voltage generated in the smoothing capacitor $C_F$, that is, the output voltage $V_L$ applied to the load resistance $R_L$, the upper direction of the drawing is a positive direction. In case of the output current $I_L$ flowing into the load resistance $R_L$, the right direction of the drawing is a positive direction.

FIGS. 3A to 3I are timing charts showing the operation of the DC power supply 1 shown in FIG. 2. In FIGS. 3A to 3I, each waveform of the voltage V and the current I in each portion of the DC power supply 1 are shown by expressing the abscissa axis as a common time t.

Figure 3A:
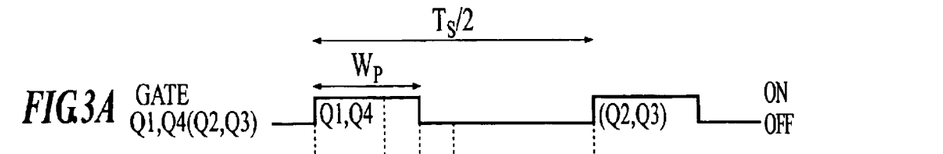
Figures 3B, 3C:
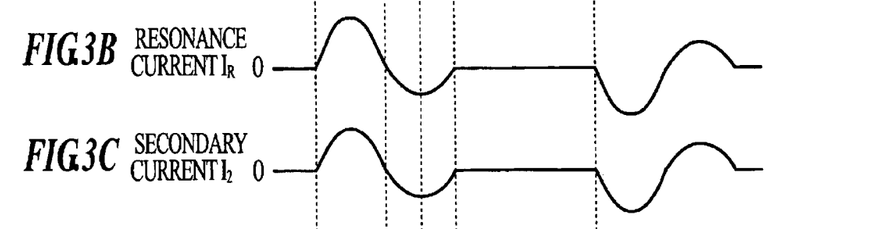
Figures 3D, 3E:
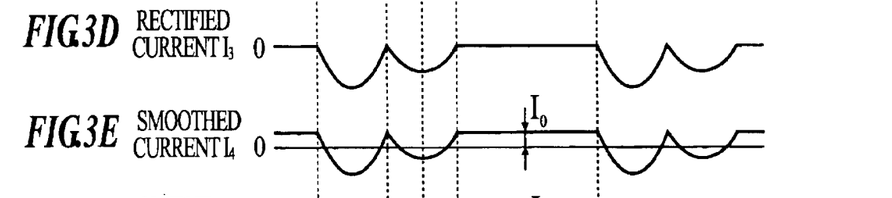
Figure 3F:
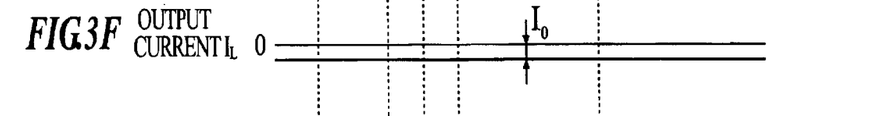
Figure 3G:
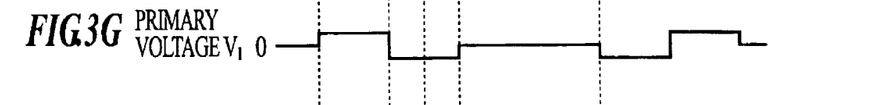
Figure 3H:
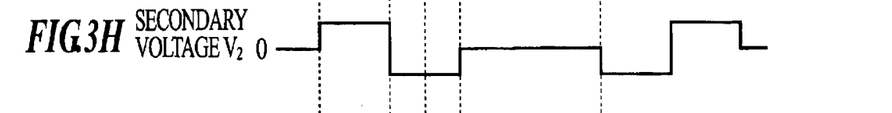
Figure 3I:
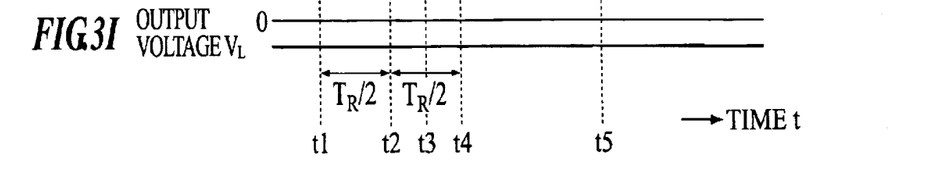

That is, FIG. 3A shows the ON/OFF operation of the semiconductor switches Q1, Q2, Q3 and Q4. FIG. 3B shows the resonance current $I_R$. FIG. 3C shows the secondary current $I_2$. FIG. 3D shows the rectified current $I_3$. FIG. 3E shows the smoothed current $I_4$. FIG. 3F shows the output current $I_L$. FIG. 3G shows the primary voltage $V_1$. FIG. 3H shows the secondary voltage $V_2$. FIG. 3I shows the output voltage $V_L$.

In FIG. 3A, a pair of the semiconductor switches Q1 and Q4 and a pair of the semiconductor switches Q2 and Q3 are alternately ON each half period of the inverter period $T_S$.

Then, the semiconductor switches Q1, Q2, Q3 and Q4 are ON only during a time period corresponding to the pulse width $W_P$ of the gate signal outputted to each semiconductor switch. The pulse width $W_P$ satisfies the inequality $T_R/2 < W_P < T_R$.

(1) Time t1 to t2

At the time t1, when the semiconductor switches Q1 and Q4 are ON, the resonance current $I_R$ flows in a positive direction. The primary voltage $V_1$ is applied to the primary winding 14a of the transformer 14 in a positive direction. Then, in the secondary winding 14b, the secondary voltage $V_2$ which is n times higher than the primary voltage $V_1$ is generated in a positive direction. Further, the secondary current $I_2$ having a 1/n amplitude of the resonance current $I_R$ flows into the secondary winding 14b in a positive direction. It is assumed that the turn ratio between the primary winding 14a and secondary winding 14b is 1:n.

Because the secondary current $I_2$ flows in a positive direction, the current flow into the diodes D2 and D3. The rectified current $I_3$ having the same amplitude as the secondary current $I_2$ flows in a negative direction. The rectified current $I_3$ is divided into the smoothed current $I_4$ for charging the smoothing capacitor $C_{F2}$ and the output current $I_L$ flowing into the load resistance $R_L$. The output voltage $V_L$ is generated when the output current $I_L$ flows into the load resistance $R_L$.

(2) Time t2 to t3

When the time corresponding to the half period $T_R/2$ of the resonance period $T_R$ elapsed from the time t1, at the time t2, the resonance current $I_R$ flows in a negative direction by inversing the polarity thereof. Because both of the semiconductor switches Q2 and Q3 are OFF, the current flows into the diodes d1 and d4 which are connected in anti-parallel with the semiconductor switches Q1 and Q4.

Thereby, each polarity of the primary voltage $V_1$, the secondary voltage $V_2$ and the secondary current $I_2$ is inversed. That is, the primary voltage $V_1$ and the secondary voltage $V_2$ are generated in a negative direction. The secondary current $I_2$ flows in a negative direction. When the secondary current flows in a negative direction, the current flows into the diodes D1 and D4. Further, the rectified current $I_3$ having the same amplitude as the secondary current $I_2$ flows in a negative direction.

Because the rectified current $I_3$ flows in a negative direction, any of the smoothed current $I_4$, the output current $I_L$ and the output voltage $V_L$ acts the same as the case (1) at the time t1.

(3) Time t3 to t4

When the time corresponding to the pulse width $W_P$ of the gate signal elapsed from the time t1, at the time t3, the semiconductor switches Q1 and Q4 are OFF. Because the current flows into the diodes d1 and d4 which are connected in parallel with the semiconductor switches Q1 and Q4, the resonance current $I_R$ consecutively flows in a negative direction.

Therefore, any of the resonance current $I_R$, the primary voltage $V_1$, the secondary voltage $V_2$, the secondary current $I_2$, the rectified current $I_3$, the smoothed current $I_4$ and the output current $I_L$ continue the operation mode which is carried out in the case (2) from the time t2.

(4) Time t4

When the time corresponding to the resonance period $T_R$ elapsed from the time t1, at the time t4, the polarity of the resonance current $I_R$ is caused to be inverted again. However, because all of the semiconductor switches Q1, Q2, Q3 and Q4 are OFF, the resonance current $I_R$ slightly flows in the same direction as the current which flows from time t1 to time t2, during the reverse recovery time of the diodes d1 and d4 into which the current has just flowed. Then, the resonance operation is finished. Because the waveforms are small during the reverse recovery time, they are not shown in FIGS. 3A to 3H. One resonance phenomenon is finished.

(5) Time t4 to t5

During this period, because the inverter 13 is OFF, the output current $I_L$ is supplied by the discharge current from the smoothing capacitor $C_{F2}$. The voltage applied to the smoothing capacitor CF2 is slightly decreased by the discharge current. This decrease in voltage becomes a pulsating quantity of the output voltage $V_L$.

(6) Time t5

When the time corresponding to the half period $T_S/2$ of the inverter period $T_S$ elapsed from the time t1, at the time t5, the semiconductor switches Q2 and Q3 are ON. The resonance current $I_R$ flows in a negative direction. All of the primary voltage $V_1$, the secondary voltage $V_2$, the secondary current $I_2$, the rectified current $I_3$, the smoothed current $I_4$, the output current $I_L$ and the output voltage $V_L$ are the same as the case (1) at the time t1 (each polarity of the primary voltage $V_1$, the secondary voltage $V_2$ and the secondary current $I_2$ is opposite to the case (1)).

As described above, the output current $I_L$ is determined by the resonance current $I_R$ The pulsating quantity thereof is determined by the resonance current $I_R$ and the smoothing capacitor $C_{F2}$. As a result, the output voltage $V_L$ is determined by the output current $I_L$ and the load resistance $R_L$.

Next, the above value $I_0$, that is, the average value $I_{LAV}$ of the output current $I_L$ will be explained.

The AC power outputted from the inverter 13 is supplied to the load resistance $R_L$ through the transformer 14, the rectifying circuit 15 and the smoothing capacitor $C_{F2}$.

Figure 4:
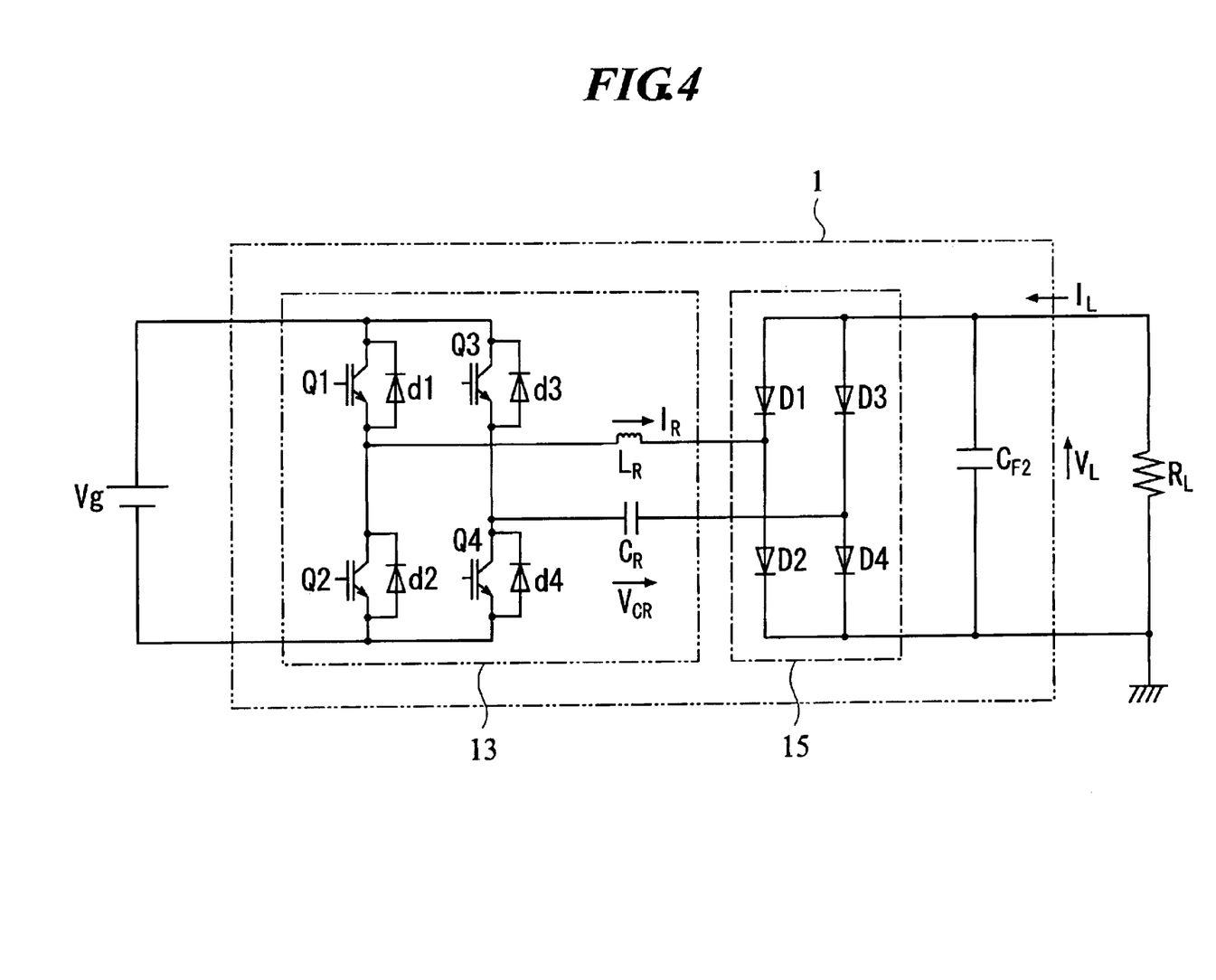
FIG. 4 is a view showing an equivalent circuit structure of the DC power supply shown in FIG. 1.

Therefore, when the DC power supply 1 shown in FIG. 2 is replaced with the equivalent circuit shown in FIG. 4, in which the transformer 14 is omitted, the average value of the resonance current $I_R$ can be calculated as the average value $I_{LAV}$ of the output current $I_L$ of the DC power supply 1.

In FIG. 4, with respect to the voltage V and the current I in each portion of the DC power supply 1, the direction of the arrow shown in the drawing is a positive direction. That is, in case of the resonance current $I_R$ flowing into the resonance reactor $L_R$, the right direction of the drawing is a positive direction. In case of the resonance voltage $V_{CR}$ applied to the resonance capacitor $C_R$, the right direction of the drawing is a positive direction. In case of the output current $I_L$, the left direction of the drawing is a positive direction. In case of the output voltage $V_L$, the upper direction of the drawing is a positive direction.

Figure 5A:
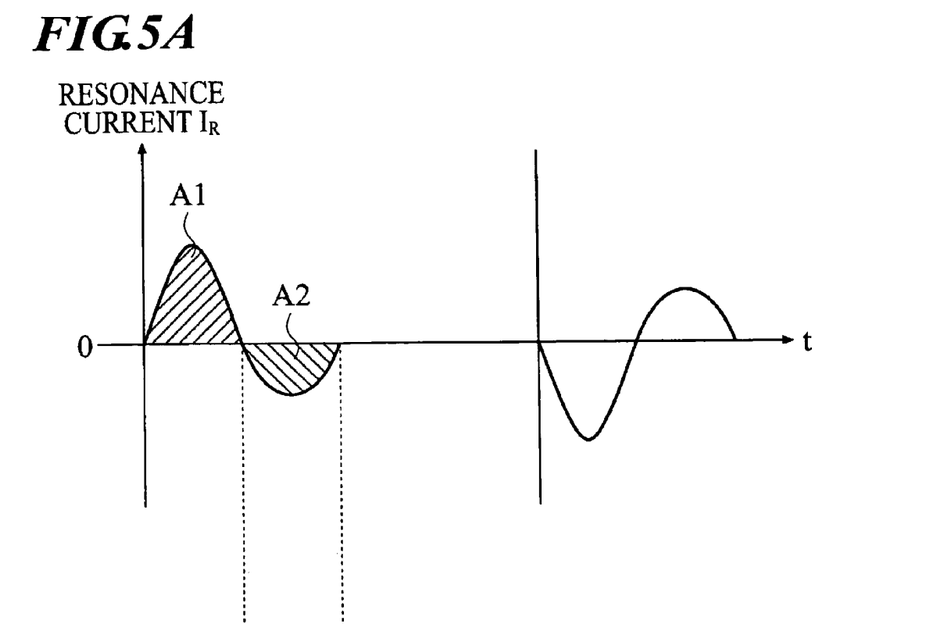
FIG. 5A is a view showing a waveform of the resonance current in FIG. 4
Figure 5B:
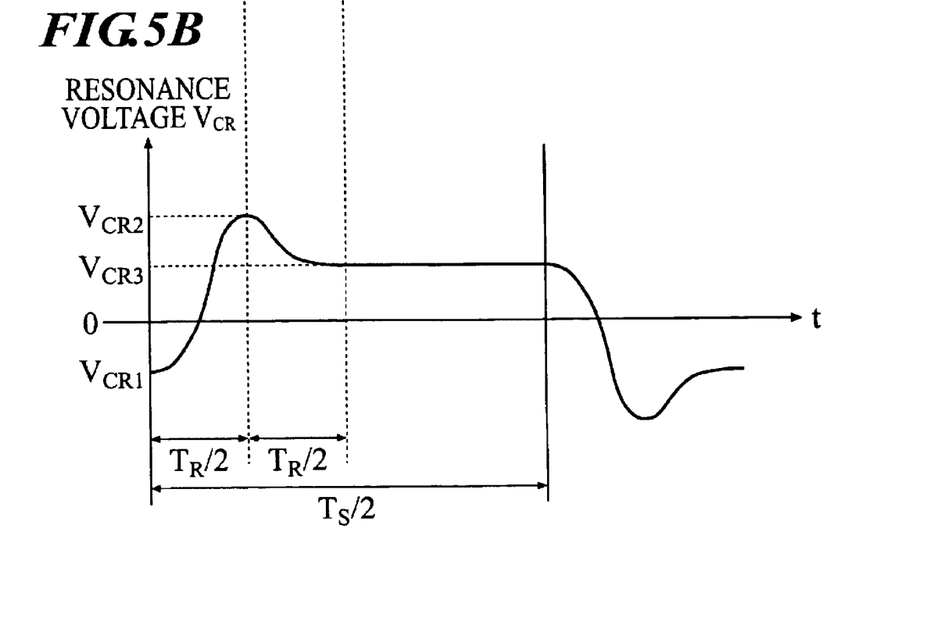
FIG. 5B is a view showing a waveform of the resonance voltage in FIG. 4.

FIGS. 5A and 5B are views showing each waveform of the resonance current $I_R$ and the resonance voltage $V_{CR}$. FIG. 5A shows the resonance current $I_R$ and FIG. 5B shows the resonance voltage $V_{CR}$ by expressing the abscissa axis as a common time t.

In FIGS. 5A and 5B, during the time corresponding to the half period $T_S/2$ of the inverter period $T_S$, the resonance current $I_R$ flowing in one resonance period $T_R$ flows. Therefore, the average value $I_{LAV}$ of the output current $I_L$ is obtained by the following equation (2).

$$I_{LAV} = \frac{2}{T_S} \int_0^{T_S/2} |I_R| dt \qquad (2)$$
$$= \frac{2}{T_S} \left[ \int_0^{T_R/2} (A_1 \text{ component in equation } I_R) dt - \int_{T_R/2}^{R} (A_2 \text{ component in equation } I_R) dt \right]$$
$$= \frac{2}{T_S} (A_1 - A_2)$$

In the above equation, A1 is an area of the field which is enclosed with the resonance current $I_R$ and the time axis, in the first half of the resonance period $T_R$, and corresponds to the integral value of the resonance current $I_R$ in the first half of the resonance period $T_R$. A1 satisfies the inequality A1>0.

A2 is an area of the field which is enclosed with the resonance current $I_R$ and the time axis, in the second half of the resonance period $T_R$, and corresponds to the integral value of the resonance current $I_R$ in the second half of the resonance period $T_R$. A2 satisfies the inequality A2<0.

A1 is calculated.

Figure 6A:
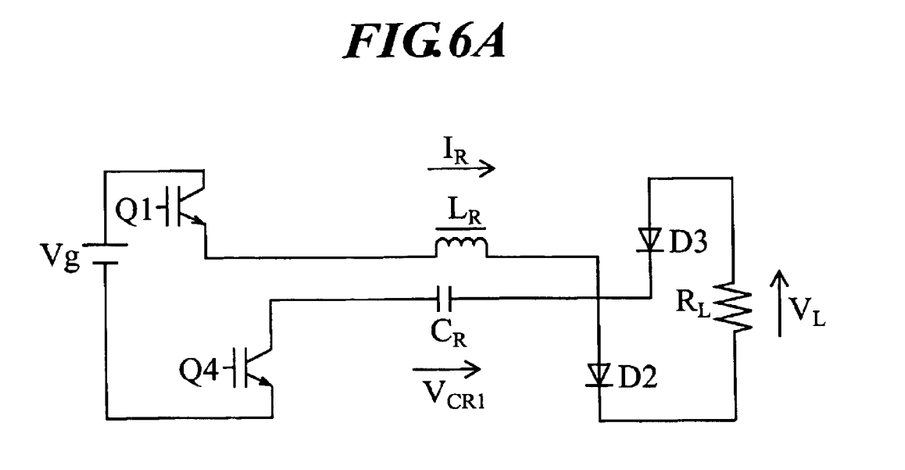
FIGS. 6A and 6B are views showing equivalent circuit structures of the DC power supply shown in FIG. 4.

FIG. 6A is a view showing an equivalent circuit structure of the DC power supply shown in FIG. 4, in the first half of the resonance period $T_R$. Then, the current flows into the semiconductor switches Q1 and Q4. The resonance current $I_R$ flows in a positive direction. The voltage $V_{LR1}$ applied to the resonance reactor $L_R$ is obtained by the following equation (3).

$$V_{LR1} = V_g + V_L - V_{CR1} \qquad (3)$$

The resonance current $I_R$ is obtained by the following equation (4).

$$I_R = \sqrt{\frac{C_R}{L_R}} V_{LR1} \sin \omega_R t \qquad (4)$$

where $\omega_R$ is a resonance angular frequency.

Therefore, from the equation (4), A1 is expressed by the following equation (5).

$$A_1 = \int_0^{T_R/2} I_R dt \qquad (5)$$
$$= \sqrt{\frac{C_R}{L_R}} V_{LR1} \frac{1}{\omega_R} [-\cos \omega_R t]_0^{T_R/2}$$
$$= \sqrt{\frac{C_R}{L_R}} V_{LR1} \frac{1}{\omega_R} \left[ -\cos \frac{2\pi}{T_R} \times \frac{T_R}{2} + \cos 0 \right]$$
$$= 2 C_R V_{LR1}$$

Next, A2 is calculated.

Figure 6B:
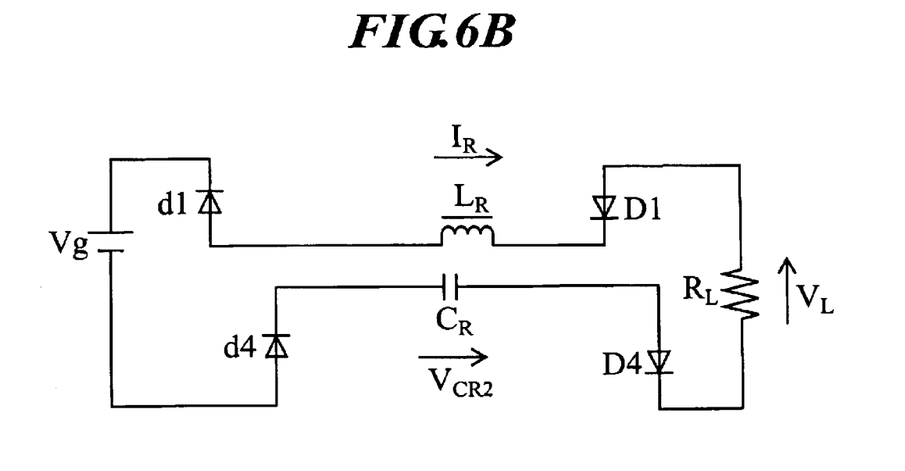

FIG. 6B is a view showing an equivalent circuit structure of the DC power supply shown in FIG. 4, in the second half of the resonance period $T_R$. Then, the current flows into the diodes d1 and d4. The resonance current $I_R$ flows in a negative direction. The voltage $V_{LR2}$ applied to the resonance reactor $L_R$ is obtained by the following equation (6).

$$V_{LR2} = -V_g + V_L + V_{CR2} \qquad (6)$$

The resonance current $I_R$ is obtained by the following equation (7).

$$I_R = \sqrt{\frac{C_R}{L_R}} V_{LR2} \sin \omega_R t \qquad (7)$$

Therefore, from the equation (7), A2 is expressed by the following equation (8).

$$A_2 = \int_{T_R/2}^{T_R} I_R dt \qquad (8)$$
$$= \sqrt{\frac{C_R}{L_R}} V_{LR2} \frac{1}{\omega_R} [-\cos \omega_R t]_{T_R/2}^{T_R}$$
$$= \sqrt{\frac{C_R}{L_R}} V_{LR2} \frac{1}{\omega_R} \left[ -\cos \frac{2\pi}{T_R} \times T_R + \cos \frac{2\pi}{T_R} \times \frac{T_R}{2} \right]$$
$$= -2 C_R V_{LR2}$$

By substituting the equations (5) and (8) for the equation (2), the following equation (9) is obtained.

$$I_{LAV} = \frac{4 C_R}{T_S} (V_{LR1} + V_{LR2}) \qquad (9)$$

By substituting the equations (3) and (6) for the above equation (9), the following equation (10) is obtained.

$$I_{LAV} = \frac{4 C_R}{T_S} (2 V_L - V_{CR1} + V_{CR2}) \qquad (10)$$

According to FIG. 5, the resonance voltage $V_{CR2}$ is expressed by the following equation (11).

$$V_{CR2} = V_{CR1} + \frac{1}{C_R} A_1 \qquad (11)$$

By substituting the equations (5) and (3) for the equation (11), the following equation (12) is obtained.

$$V_{CR2} = V_{CR1} + 2(V_g + V_L - V_{CR1}) \qquad (12)$$
$$= 2(V_g + V_L) - V_{CR1}$$

According to FIG. 5, the resonance voltage $V_{CR3}$ is expressed by the following equation (13).

$$V_{CR3} = V_{CR2} + \frac{1}{C_R} A_2 \qquad (13)$$

By substituting the equations (8) and (6) for the equation (13), the following equation (14) is obtained.

$$V_{CR3} = V_{CR2} - 2(-V_g + V_L + V_{CR2}) \quad (14)$$
$$= 2(V_g - V_L) - V_{CR2}$$

According to FIG. 5, the relation between the resonance voltages $V_{CR1}$ and $V_{CR3}$ is expressed by the following equation (15).

$$V_{CR1} = -V_{CR3} \quad (15)$$

Therefore, by substituting the equations (15) and (14) for the equation (12), the following equation (16) is obtained.

$$V_{CR2} = 2(V_g + V_L) + 2(V_g - V_L) - V_{CR2} \quad (16)$$
$$\therefore V_{CR2} = 2V_g$$

By substituting the equations (14) and (10) for the equation (15), the following equation (17) is obtained.

$$V_{CR1} = 2(V_g + V_L) - V_{CR2} \quad (17)$$
$$= 2(V_g + V_L) - 2V_g$$
$$= 2V_L$$

Therefore, by substituting the equations (17) and (16) for the equation (10), the following equation (18) is obtained.

$$I_{LAV} = \frac{4C_R}{T_S}(2V_L - 2V_L + 2V_g) \quad (18)$$
$$= \frac{8C_R V_g}{T_S}$$

As described above, the average value $I_{LAV}$ of the output current $I_L$ can be calculated.

In the equation (18), $C_R$ is the capacitance of the resonance capacitor $C_R$, and $V_g$ is the voltage value of the DC power supply $V_g$. The two values are constant. That is, the average value $I_{LAV}$ of the output current $I_L$ depends on the inverter period $T_S$.

In case that the plasma generating device 4 is replaced with the load resistance $R_L$, "the generation of the arc discharge" can be regarded as "rapid decrease in the load resistance $R_L$". Further, "unstable discharge phenomenon" can be regarded as "periodic or aperiodic fluctuation in a part of the load resistance $R_L$".

However, as shown in the equation (18), the average value $I_{LAV}$ of the output current $I_L$ does not depend on the load resistance $R_L$. That is, the DC power supply 1 functions as a current source. Therefore, during the arc generation or even in an unstable discharge condition, the DC power supply 1 can supply the stable DC power of which the current hardly fluctuates, to the plasma generating device 4 as a load.

Next, the reverse voltage generating circuit 20, the ignition power supply circuit 30 and the power regenerative circuit 40 will been explained in detail.

In FIG. 1, the reverse voltage generating circuit 20 comprises a tertiary winding 21 which is electromagnetically coupled with the primary winding 14a of the transformer 14, a rectifier 22 having four bridge-connected diodes, a smoothing capacitor $C_B$, a DC reactor $L_B$ and a semiconductor switch Q5.

The both ends of the tertiary winding 21 are connected with the input ends of the rectifier 22. An AC power generated by the tertiary winding 21 is outputted to the rectifier 22.

The input ends of the rectifier 22 are connected with the both ends of the tertiary winding 21. The output ends thereof are connected with the both ends of the smoothing capacitor $C_B$. The rectifier 22 carries out the full wave rectification of the AC power generated in the tertiary winding 21 to output the rectified power to the smoothing capacitor $C_B$.

One end of the smoothing capacitor $C_B$ is connected with one of the output terminals of the rectifier 22 and the collector of the semiconductor switch Q5. The other end thereof is connected with the other of the output terminals of the rectifier 22. The smoothing capacitor $C_B$ smoothes the DC power rectified by the rectifier 22.

One end of the DC reactor $L_B$ is connected with one end of the smoothing capacitor $C_{F2}$. The other end thereof is connected with the emitter of the semiconductor switch Q6.

The semiconductor switch Q5 is, for example, an IGBT or the like. By the voltage signal (gate signal) inputted into the gate of the semiconductor switch Q5, a conducting/breaking condition (ON/OFF) between the collector and the emitter is controlled. The emitter of the semiconductor switch Q5 is connected with the other end of the reactor $L_B$. The collector thereof is connected with one of the output ends of the rectifier 22 and one end of the smoothing capacitor $C_B$.

Figure 7:
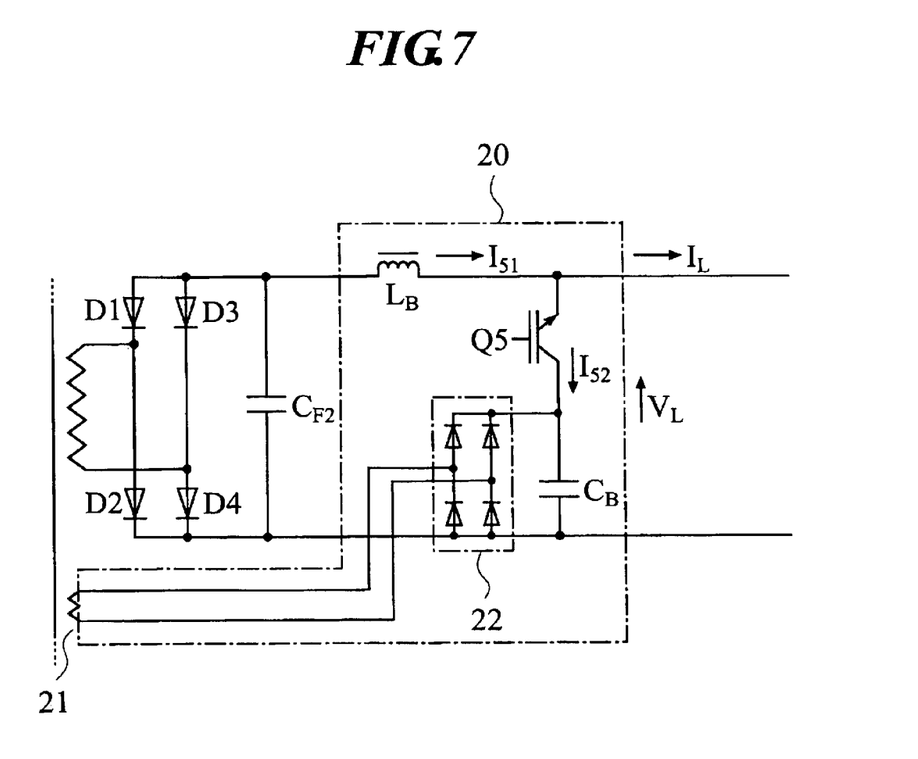
FIG. 7 is a view showing the structure of the reverse voltage generating circuit.

As shown in FIG. 7, with respect to the voltage V and the current I shown in each portion of the reverse voltage generating circuit 20, the directions of the arrows shown in the drawing are positive directions. That is, in case of the input current $I_{S1}$ which flows into the DC reactor $L_B$, the right direction of the drawing is a positive direction. In case of the reflow current $I_{S2}$ which flows into the semiconductor switch Q5, the lower direction of the drawing is a positive direction. In case of the output current $I_L$, the right direction of the drawing is a positive direction. In case of the output voltage $V_L$, the upper direction of the drawing is a positive direction.

By the gate signal inputted into the semiconductor switch Q5, the reverse voltage generating circuit 20 is operated as follows.

Figure 8A:
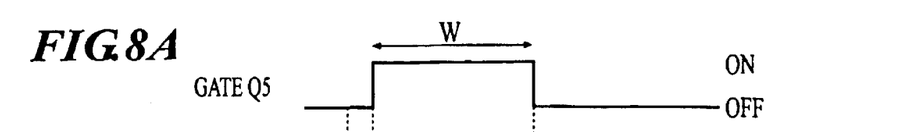
FIGS. 8A and 8E are timing charts showing the operation of the reverse voltage generating circuit shown in FIG. 7.
Figure 8B:
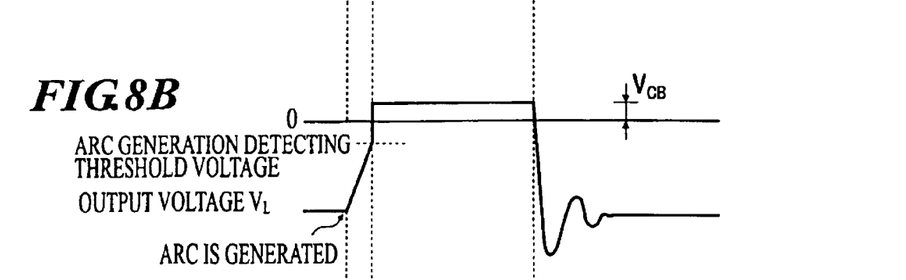
Figure 8C:
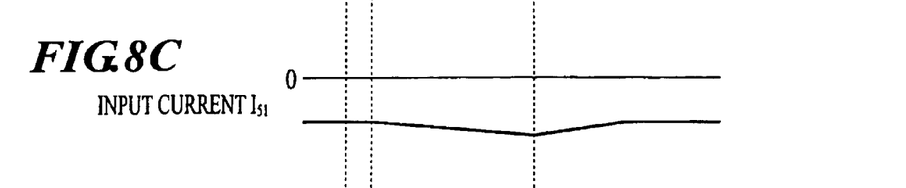
Figure 8D:
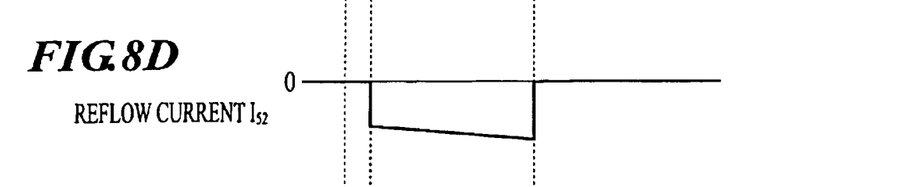
Figure 8E:
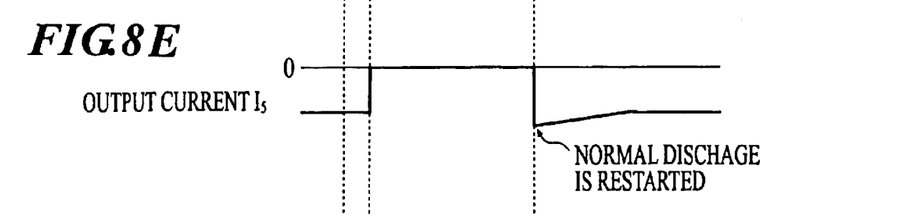

FIGS. 8A and 8E are timing charts showing the operation of the reverse voltage generating circuit 20. In these drawings, each waveform of the voltage V and the current I in each portion of the reverse voltage generating circuit 20 are shown by expressing the abscissa axis as a common time t.

That is, FIG. 8A shows the ON/OFF operation of the semiconductor switch Q5. FIG. 8B shows the output voltage $V_L$. FIG. 8C shows the input current $I_{S1}$. FIG. 8D shows the reflow current $I_{S2}$. FIG. 8E shows the output current $I_L$.

At the time t11, an arc is generated and the output voltage $V_L$ drops. At the time t12, the output voltage $V_L$ is lower than the threshold value which is previously set to a predetermined voltage. Then, by inputting the gate signal, the semiconductor switch Q5 is ON.

The input current $I_{S1}$ which flowed in the output side, flows into the semiconductor switch Q5 and reflows in the reverse voltage generating circuit 20. That is, the reflow current $I_{S2}$ starts to flow. Then, the DC power rectified by the rectifier 22 and smoothed by the smoothing capacitor $C_B$, is added to the output voltage $V_L$ in a positive direction. Because the sum of the voltage applied to the both ends of the smoothing capacitor $C_{F2}$ and the voltage applied to the both ends of the smoothing capacitor $C_B$ is shorted through the DC reactor $L_B$, the reflow current $I_{S2}$ has a slope shown in FIG. 8D. Further, the applying direction of the output voltage $V_L$ is inversed from a negative direction to the positive direction. A reverse voltage $V_{CB}$ is applied to the plasma generating device 4 which is treated as a load.

When the time corresponding to the pulse width W of the gate signal elapsed, at the time t13, the semiconductor switch Q5 is OFF. Then, the reflow current $I_{S2}$ (input current $I_{S1}$) which reflowed in the reverse voltage generating circuit 20, flows to the output side again.

At the same time, by discharging the energy stored in the DC reactor $L_B$, the output voltage VL applied in a negative direction, is temporarily increases. Thereby, the reflow of the discharge current is promoted and the normal discharge is rapidly restarted.

The arc generation is detected depending to whether the value of the output voltage $V_L$ is lower than the threshold value. The reasons are described as follows.

(1) The DC power supply 1 is a current type of one.

As described above, the DC power supply 1 functions as a current source. That is, even though the arc is generated, the output current $I_L$ does not increase. On the contrary, because the output voltage $V_L$ is lowered to the arc voltage in the plasma generating device 4, the arc generation is detected by the output voltage $V_L$.

(2) The false detection is not carried out by the transient phenomenon.

The arc generation is detected by the change of the output voltage $V_L$ (for example, differential value). However, as described above, in the restart of the normal discharge (the time t13 of FIG. 8E), there is some possibility that the output voltage $V_L$ rapidly increases. Then, in the restart of the discharge, the output voltage $V_L$ is lowered to the normal discharge voltage. In order not to judge the lowered voltage to be the arc generation, the value itself of the output voltage $V_L$ is monitored. When the output voltage exceeds the threshold value, it is judged that the arc is generated.

Next, the ignition power supply circuit 30 will be explained.

According to FIG. 1, the ignition power supply circuit 30 comprises two tertiary windings 31a and 31b which are electromagnetically coupled with the primary winding 14a of the transformer 14, diodes D6a D6b which are connected in parallel, and a semiconductor switch Q6.

In case of the tertiary winding 31a, the head thereof is connected with the diode D6a. The end thereof is connected with the head of the secondary winding 14b. In case of the tertiary winding 31b, the head thereof is connected with the end of the secondary winding 14b. The end thereof is connected with the cathode of the diode D6b.

In case of the diode D6a, the cathode thereof is connected with the head of the tertiary winding 31a. The anode thereof is connected with the anode of the diode D6b and the emitter of the semiconductor switch Q6. In case of the diode D6b, the cathode thereof is connected with the end of the tertiary winding 31b. The anode thereof is connected with the anode of the diode D6a and the emitter of the semiconductor switch Q6.

The semiconductor switch Q6 is, for example, an IGBT or the like. By a voltage signal (gate signal) inputted into the gate thereof, a conducting/breaking condition (ON/OFF) between the emitter and the collector is controlled. In case of the semiconductor switch Q6, the emitter thereof is connected with each anode of the diodes D6a and D6b. The collector thereof is connected with a connecting point between the diodes D1 and D3.

The ignition power supply circuit 30 is operated by the ON/OFF operation of the semiconductor switch Q6 as follows.

That is, when the semiconductor switch Q6 is ON, by using the AC power generated by each of the tertiary windings 31a and 31b, the current flows in the ignition power supply circuit 30. Then, the current flows into the diodes D6a and D6b alternately in each half of the resonance period $T_R$, for example, in the first half of the resonance period $T_R$, the current flows into the diode D6a by the generated power of the tertiary winding 31a. In the latter half of the resonance period $T_R$, the current flows into the diode D6b by the generated power of the tertiary winding 31b.

Therefore, the current flows into the diode D6a and the diode D4, or the diode D6b and the diode D2 alternately. The sum of the voltage applied to the secondary winding 14b and the tertiary winding 31a and the voltage applied to the secondary winding 14b and the tertiary winding 31b is rectified to output it alternately.

In order to start the discharge, it is required to apply the voltage higher than the normal discharge voltage, to the plasma generating device 4. When the discharge of the plasma generating device 4 is started, the semiconductor switch Q6 is ON. Then, the output voltage $V_L$ of the DC power supply 1 temporarily increases by operating the ignition power supply circuit 30. Thereby, the rapid start of the discharge can be realized. After the success in ignition, the semiconductor switch Q6 is OFF to cutting off this circuit.

Next, the power regenerative circuit 40 will be explained.

According to FIG. 1, the power regenerative circuit 40 comprises, a tertiary winding 41 which is electromagnetically coupled with the primary winding 14a of the transformer 14, a rectifier 42 having four bridge-connected diodes, a DC filter 43 having a DC reactor $L_{F4}$ and a smoothing capacitor $C_{F4}$, a diode D7 and a semiconductor switch Q7.

Both ends of the tertiary winding 41 are connected with the input ends of the rectifier 42. The AC power generated in the tertiary winding 41 is outputted to the rectifier 42.

The input end of the rectifier 42 is connected with both ends of the tertiary winding 41. The output end thereof is connected with the input end of the DC filter 43. The rectifier 42 carries out the full-wave rectification of the AC power generated in the tertiary winding 41, to output it to the DC filter 43.

The input end of the DC filter 43 is connected with the output end of the rectifier 42. The output end thereof is connected with the emitter and the collector of the semiconductor switch Q7. The DC filter 43 smoothes the DC power rectified by the rectifier 42.

The cathode of the diode D7 is connected with one end of the smoothing capacitor $C_{F1}$. The anode thereof is connected with one of the output ends of the DC filter 43 and the collector of the semiconductor switch Q7.

The semiconductor switch Q7 is, for example, an IGBT or the like. By a voltage signal (gate signal) inputted into the gate thereof, a conducting/breaking condition (ON/OFF) between the emitter and the collector is controlled. In case of the semiconductor switch Q7, the collector thereof is connected with one of the output ends of the DC filter 43 and the anodes of the diode D7. The emitter thereof is connected with the other of the output ends of the DC filter 43 and the other end of the smoothing capacitor $C_{F1}$.

The power regenerative circuit 40 is operated by the ON/OFF operation of the semiconductor switch Q7 as follows.

The AC power generated by the tertiary winding 41 is rectified by the rectifier 42 and is smoothed by the DC filter 43. When the semiconductor switch Q7 is ON, the short-circuit current flows through the DC reactor $L_{F4}$. The energy is stored in the DC reactor $L_{F4}$.

On the other hand, when the semiconductor switch Q7 is OFF, the energy stored in the DC reactor $L_{F4}$ is released. With respect to the potential, the energy is overlapped to the output voltage of the rectifier 42 and is released to the smoothing capacitor $C_{F1}$. As described above, this circuit is the so-called step-up type of chopper circuit. By this operation, the power transmitted from the smoothing capacitor $C_{F1}$ can be regenerated in the smoothing capacitor $C_{F1}$ again.

As shown in the equation (18), the output current $I_L$ of the DC power supply 1 does not depend on the load resistance $R_L$ and is determined by the inverter frequency $F_S$ (=1/$T_S$). That is, as the load is lightened and the output current $I_L$ is decreased, the inverter frequency $F_S$ is gradually lowered. Therefore, the inverter frequency $F_S$ reaches the lower limit frequency $F_{Smin}$. This condition corresponds to the lower limit of the power supplied by the inverter 13.

When the output setting is further lightened, the power supplied by the inverter 13 exceeds the output setting value. That is, because the power which is not required for the load is transmitted to the load, the DC power supply 1 cannot be controlled. Thereby, during the light load, the power generated by the inverter 13 and the power corresponding to the difference in the consumed power in the load are required to be regenerated in the power supply. Therefore, during the light load, by operating the power regenerative circuit 30, the power which is higher than the setting output is regenerated in the power supply to realize the stable control.

By treating the DC power supply 1 as a current source with a current type of inverter in the above structure, the DC power supply 1 does not easily influence the plasma generating device 4 as a load. As a result, the DC power having a stable current can be outputted. By having the power regenerative circuit 40, even in the light load or in the non-load, the DC power supply 1 can be stably controlled.

Further, by the reverse voltage generating circuit 20, the generated arc can be forcedly arc-extinguished immediately. By the ignition power supply circuit 30, when the operation of the plasma generating circuit 30 is started, it is possible to realize the start of the discharge rapidly and reliably.

In the above embodiment, the DC power supply 1 which is realized by analog circuits, will be explained. However, the present invention is applied to the DC power supply which is realized by digital circuits.

According to the present invention, the DC power supply which is a current source, can output the stabilized DC power and can keep the discharge current which flows in the plasma generating circuit, to be stable. Further, it is possible to detect the arc generation reliably and to forcedly extinguish the arc. After the arc-extingishment it is possible to restart the normal discharge rapidly.

The entire disclosure of Japanese Patent Application No. Tokugan 2002-197478 filed on Jul. 5, 2002 including specification, claims drawings and summary are incorporated herein by reference in its entirety.

What is claimed is:

1. A DC power supply apparatus for supplying a DC power to a plasma generating device, comprising:

an input section for converting an inputted AC power into a first DC power;

a current type of inverter connected with a next stage of the input section;

a transformer having a primary winding and a secondary winding, the primary winding being connected with the current type of inverter;

a rectifying section for rectifying a first AC power generated in the secondary winding of the transformer; and a smoothing circuit for smoothing the rectified power which is rectified by the rectifying section;

wherein an electric energy to be supplied to the plasma generating device is controlled by controlling a switching operation of the current type of inverter as a current source.

2. The DC power supply apparatus as claimed in claim 1, wherein the current type of inverter is a series-resonance type of inverter having a resonance reactor and a resonance capacitor which are connected in series.

3. The DC power supply apparatus as claimed in claim 1, further comprising a reverse voltage generating circuit which comprises:

a first tertiary winding which is electromagnetically coupled with the primary winding of the transformer;

a capacitor for rectifying a second AC power generated in the first tertiary winding and for storing a second DC power; and a voltage applying section for monitoring whether an output voltage outputted to the plasma generating device is lower than a predetermined threshold value voltage, and for applying a reverse voltage to the plasma generating device by discharging the second DC power stored in the capacitor.

4. The DC power supply apparatus as claimed in claim 1, further comprising a power regenerative section which comprises a second tertiary winding which is electromagnetically coupled with the primary winding of the transformer;

wherein a third AC power generated in the second tertiary winding is rectified and is converted into a third DC power, the power regenerative section regenerates the third DC power to the input section.

5. The DC power supply apparatus as claimed in claim 1, further comprising a step-up section which comprises a third tertiary winding which is electromagnetically coupled with the primary winding of the transformer;

wherein by overlapping a fourth DC power obtained from a fourth AC power generated in the third tertiary winding and a main DC power obtained from the first AC power generated in the secondary winding of the transformer, the step-up section temporarily steps up an apparatus output voltage to be outputted from the DC power supply apparatus.

6. The DC power supply apparatus as claimed in claim 2, wherein the current type of inverter comprises four semiconductor switches which are bridge-connected.

7. The DC power supply apparatus as claimed in claim 6, wherein each semiconductor switch is connected with a diode in anti-parallel.

* * * * *